(12) United States Patent
Kuroda et al.

(10) Patent No.: US 6,314,347 B1
(45) Date of Patent: Nov. 6, 2001

(54) DRIVING CONTROL APPARATUS OF HYBRID VEHICLE AND METHOD THEREOF

(75) Inventors: Kouichi Kuroda, Kanagawa-ken; Hiroshi Takahashi, Tokyo; Itsuro Muramoto; Yoshitaka Deguchi, both of Kanagawa-ken, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/571,176

(22) Filed: May 16, 2000

(30) Foreign Application Priority Data

May 20, 1999 (JP) .................................. 11-140154

(51) Int. Cl.⁷ .................................................. G01C 21/00
(52) U.S. Cl. ............................... 701/22; 701/23; 701/25
(58) Field of Search ................................. 701/22, 23, 25, 701/26, 200, 201, 202, 208, 209, 213, 54, 55, 56, 207, 210; 60/295, 285

(56) References Cited

U.S. PATENT DOCUMENTS 4,796,189 * 1/1989 Nakayama et al. ................... 701/209
5,931,886 * 8/1999 Moroto et al. .......................... 701/54
6,014,607 * 1/2000 Yagyu et al. .......................... 701/202
6,032,461 * 3/2000 Kinugasa et al. ...................... 60/295
6,061,625 * 5/2000 Fastenrath ............................ 701/117

FOREIGN PATENT DOCUMENTS 9-324665   12/1997   (JP) .

* cited by examiner

*Primary Examiner*—William A. Cuchlinski, Jr.
*Assistant Examiner*—Marthe Marc-Coleman
(74) *Attorney, Agent, or Firm*—McDermott, Will & Emery

(57) ABSTRACT

An apparatus and method of driving control of a hybrid vehicle in the invention divides a route into a plurality of section on the basis of a point at which start of the vehicle is predicted and a point at which stop of the vehicle is predicted or a start point of a regeneration section in which the motor continuously performs a regenerating operation for a predetermined time or longer as a border; estimates a vehicle speed pattern for each of the plurality of sections on the basis of a road condition and a driving history; and sets an operating schedule of the engine and the motor so as to minimize the fuel consumption of the engine to the destination on the basis of the vehicle speed pattern and fuel consumption characteristics of the engine.

7 Claims, 8 Drawing Sheets

| ROAD | HIGHWAY | GENERAL | CITY | ---- |
|------|---------|---------|------|------|
| Vm | 95(km/h) | 50(km/h) | 27(km/h) | ---- |
| Am | 0.08(G) | 0.05(G) | 0.02(G) | ---- |
| Dm | -0.09(G) | -0.06(G) | -0.02(G) | ---- |

DRIVING CONTROL APPARATUS OF HYBRID VEHICLE AND METHOD THEREOF

BACKGROUND OF THE INVENTION

The present invention relates to a driving control apparatus of a hybrid vehicle and method thereof, and more particularly, to an apparatus and method that set an operating schedule of an engine and a motor so as to minimize fuel consumption in accordance with road conditions of a route to a destination.

Japanese Patent Application Laid-Open Publication No. 9-324665 discloses an operating control apparatus for auxiliary equipments of an internal combustion engine by making an operating schedule of the auxiliary equipments so as to minimize the fuel consumption on the basis of predicted driving load and engine load and operating the auxiliary equipments in accordance with the operating schedule.

SUMMARY OF THE INVENTION

In such an operating control apparatus for auxiliary equipments of an internal combustion engine, however, a driving load and an engine load only at the time of constant driving are determined. A decrease in fuel consumption due to energy collection at the time of deceleration and braking and an increase in fuel consumption at the time of acceleration are not considered. Consequently, the fuel consumption is not sufficiently reduced.

It is an object of the invention to provide a driving control apparatus of a hybrid vehicle and method thereof, which can set an operating schedule of an engine and a motor so as to minimize the fuel consumption in accordance with a road condition of a route to a destination.

According to the invention, there is provided a driving control apparatus of a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising: a route retrieving unit retrieving a route to a destination; a road condition detecting unit detecting a road condition of the route; a route dividing unit dividing the route into a plurality of sections on the basis of a point at which start of the hybrid vehicle is predicted and a point at which stop of the hybrid vehicle is predicted on the basis of the road condition; a driving history recording unit for recording driving history; a vehicle speed pattern estimating unit estimating a vehicle speed pattern for each of the plurality of sections on the basis of the road condition and the driving history; and a schedule setting unit setting an operating schedule of the engine and the motor so as to minimize the fuel consumption of the engine to the destination on the basis of the vehicle speed pattern and fuel consumption characteristics of the engine.

In other words, the driving control apparatus of a hybrid vehicle of the invention is applied to a hybrid vehicle having a similar main construction as above mentioned and comprises: route dividing means for dividing a route to a destination into a plurality of sections on the basis of a point at which start of the vehicle is predicted and a point at which stop of the vehicle is predicted on the basis of a road condition of the route; vehicle speed pattern estimating means for estimating a vehicle speed pattern for each of the plurality of sections on the basis of the road condition and a driving history; and schedule setting means for setting an operating schedule of the engine and the motor so as to minimize the fuel consumption of the engine to the destination on the basis of the vehicle speed pattern and fuel consumption characteristics of the engine.

According to the driving control apparatus of a hybrid vehicle of the invention is applied to a hybrid vehicle having a similar construction and comprises: a route retrieving unit retrieving a route to a destination; a road condition detecting unit detecting a road condition of the route; a route dividing unit dividing the route into a plurality of sections by using a start point of a regeneration section, in which the motor continuously performs a regenerating operation for a predetermined time or longer, as a border on the basis of the road condition; a driving history recording unit recording driving history; a vehicle speed pattern estimating unit estimating a vehicle speed pattern for each of the plurality of sections on the basis of the road condition and the driving history; and a schedule setting unit setting an operating schedule of the engine and the motor so as to minimize the fuel consumption of the engine to the destination on the basis of the vehicle speed pattern and fuel consumption characteristics of the engine.

In other words, the driving control apparatus of a hybrid vehicle of the invention is applied to a hybrid vehicle having a similar main construction as above mentioned and comprises: route dividing means for dividing a route to a destination into a plurality of sections by using a start point of a regeneration section in which the motor continuously performs a regenerating operation for a predetermined time or longer as a border on the basis of a road condition of the route; vehicle speed pattern estimating means for estimating a vehicle speed pattern for each of the plurality of sections on the basis of the road condition and a driving history; and schedule setting means for setting an operating schedule of the engine and the motor so as to minimize the fuel consumption of the engine to the destination on the basis of the vehicle speed pattern and fuel consumption characteristics of the engine.

On the other hand, a hybrid vehicle driving method of the invention is applied to a hybrid vehicle of a similar main construction as above mentioned and comprises: dividing a route to a destination into a plurality of sections on the basis of a point at which start of the vehicle is predicted and a point at which stop of the vehicle is predicted on the basis of a road condition of the route; estimating a vehicle speed pattern for each of the plurality of sections on the basis of the road condition and a driving history; and setting an operating schedule of the engine and the motor so as to minimize the fuel consumption of the engine to the destination on the basis of the vehicle speed pattern and fuel consumption characteristics of the engine.

A hybrid vehicle driving method of the invention is applied to a hybrid vehicle of a similar main construction as above mentioned and comprises: dividing a route to a destination into a plurality of sections by using a start point of a regeneration section in which the motor continuously performs a regenerating operation for a predetermined time or longer as a border on the basis of a road condition of the route; estimating a vehicle speed pattern for each of the plurality of sections on the basis of the road condition and a driving history; and setting an operating schedule of the engine and the motor so as to minimize the fuel consumption of the engine to the destination on the basis of the vehicle speed pattern and fuel consumption characteristics of the engine.

DETAILED DESCRIPTION OF THE PREFERRED EMBODIMENT

An embodiment of a driving control apparatus and method of a hybrid vehicle of the invention will be described in detail hereinbelow with reference to the drawings.

Figure 1:
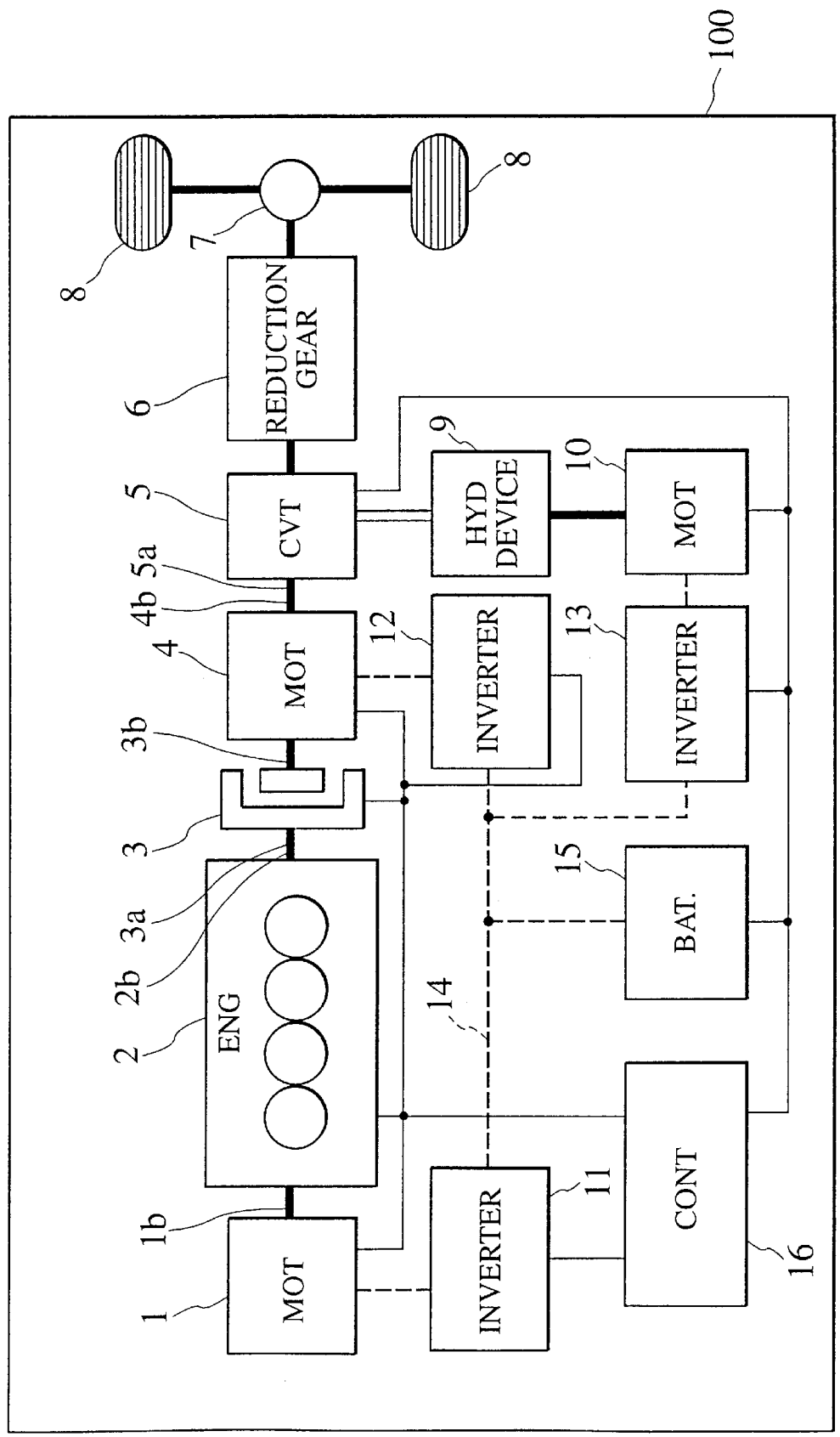
FIG. 1 shows a construction of a driving control apparatus of a hybrid vehicle according to an embodiment of the invention.
Figure 2:
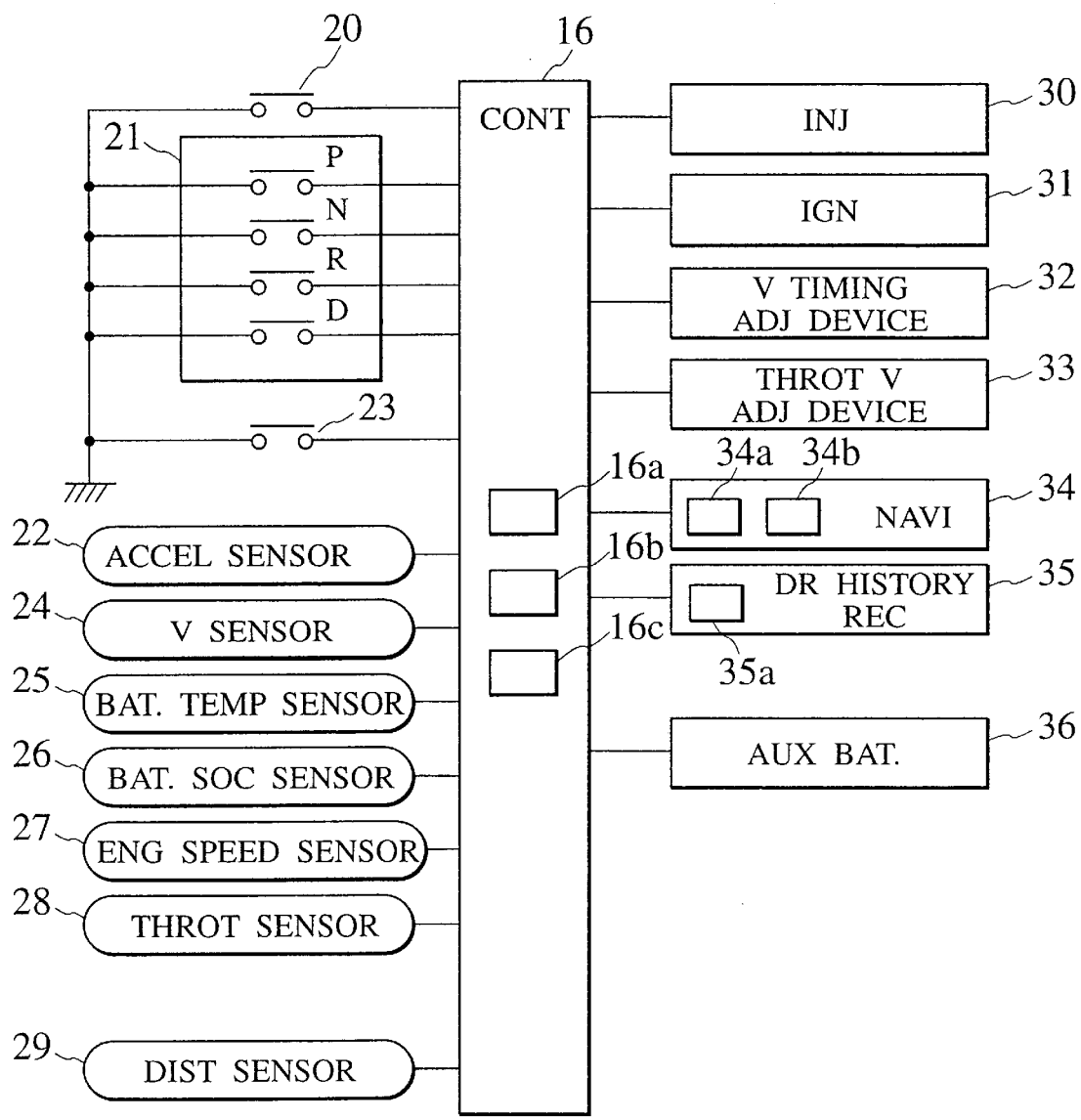
FIG. 2 specifically shows the construction of the driving control apparatus according to the embodiment.

In FIGS. 1 and 2, thick solid lines show a transmitting route for a force of a mechanical system, thick broken lines show electric power lines, thin solid lines indicate control lines, and a double line shows a hydraulic system.

The power train of a hybrid vehicle 100 includes a motor 1, an engine 2, a clutch 3, a motor 4, a continuously variable transmission (CVT) 5, a reduction gear 6, a differential gear 7, and driving wheels 8. The clutch 3 is interposed between the engine 2 and the motor 4. The output axis 1b of the motor 1, the output axis 2b of the engine 2, and the input axis 3a of the clutch 3 are connected to each other. The output axis 3b of the clutch 3. the output axis 4b of the motor 4, and the input axis 5a of the CVT 5 are connected to each other. Obviously, the construction of the power train of the hybrid vehicle 100 is not limited to the embodiment.

At the time of activation of the clutch 3, only the engine 2 or the engine 2 and the motor 4 is/are the source of driving the vehicle. At the time of release of the clutch 3, only the motor 4 is the source of driving the vehicle. The driving power of the engine 2 and/or the motor 4 is transmitted to the driving wheels 8 via a power transmitting mechanism, that is, the CVT 5, reduction gear 6, and differential gear 7. A hydraulic oil is supplied from a hydraulic device 9 to the CVT 5 for lubrication with the clamp of a belt. An oil pump (not shown) of the hydraulic device 9 is driven by a motor 10.

Each of the motors 1, 4, and 10 is a three-phase synchronous motor or three-phase induction motor. The motor 1 is used to start of the engine 2 when the clutch 3 is activated and to generate power when the clutch 3 is released. The motor 4 is used for driving the vehicle and for braking during power regeneration. The motor 10 is used to drive the oil pump of the hydraulic device 9. Each of the motors 1, 4, and 10 is not limited to an AC motor but can be a DC motor.

The clutch 3 is a powder clutch capable of adjusting a transmission torque. The clutch 3 can also take the form of a dry type single plate clutch or a wet type multi plate clutch. The CVT 5 is of a belt type or a troydal type and can adjust the gear ratio variably.

The motors 1, 4, and 10 are driven via inverters 11, 12, and 13, respectively. The inverters 11 to 13 are connected to a main battery 15 via a common DC link 14, convert a DC charged power of the main battery 15 to an AC power and supply the AC power to the motors 1, 4, and 10, respectively. The inverters 11 to 13 also convert the AC generated power of the motors 1 and 4 to a DC power and charge the main battery 15 with the DC power. Since the inverters 11 to 13 are connected to each other via the DC link 14, the power generated by the motor being regenerating can bypass the main battery 15 and can be directly supplied to a motor which is operating as a driving source. The main battery 15 can take the form of various primary or secondary batteries such as lithium ion battery, nickel hydrogen battery, and lead battery and an electric double-layer capacitor, that is, so called a power capacitor.

A controller 16 has necessary parts such as a microcomputer and a memory and controls the rotational speed and output torque of the engine 2, the transmission torque of the clutch 3, the rotational speed and output torque of each of the motors 1, 4, and 10, the gear ratio of the CVT 5, and the like.

As shown in FIG. 2, to the controller 16, a key switch 20, a selector lever switch 21, an accelerator sensor 22, a brake switch 23, a vehicle velocity sensor 24, a battery temperature sensor 25, a battery SOC sensor 26, an engine speed sensor 27, a throttle sensor 28, and a sensor 29 of a distance between vehicles (distance sensor) are connected.

When the key of the vehicle is set in the ON position or START position, the key switch 20 is turned on (closed). The selector lever switch 21 has a parking switch P, a neutral switch N, a reverse switch R, and a drive switch D. In the selector lever switch 21, a switch according to the set position of a selector lever (not shown) of the vehicle is turned on. The accelerator sensor 22 senses stepping-on stroke of an accelerator pedal (not shown). The brake switch 23 detects the stepping-on state of a brake pedal (not shown). The vehicle velocity sensor 24 senses the driving speed of the vehicle. The battery temperature sensor 25 senses the temperature of the main battery 15. The battery SOC sensor 26 senses the state of charge of the main battery 15 and the engine speed sensor 27 senses the rotational speed of the engine 2. The throttle sensor 28 senses the opening of the throttle valve. The distance sensor 29 senses a distance between the vehicle with a vehicle ahead.

To the controller 16, a fuel injection system 30, an ignition device 31, a valve timing adjusting device 32, a throttle valve adjusting device 33, a navigation system 34, a driving history recording device 35, and an auxiliary battery 36 of the engine 2 are connected. The controller 16 controls the fuel injection system 30 to supply and stop a fuel to the engine 2 and adjust a fuel injection amount. The controller 16 also controls the ignition device 3.1 to ignite the fuel in the engine 2 and controls the valve timing adjusting device 32 to adjust the closing timing of an intake valve of the engine 2. The controller 16 further controls the throttle valve adjusting device 33 to adjust the torque of the engine 2 and controls the inverters 11, 12 and 13 to adjust the torque and rotational speed of the motors 1, 4 and 10.

The navigation system 34 comprises a satellite navigation device for detecting the present location of the vehicle by a GPS receiver, a self navigation device for detecting a driving route by a gyrocompass or the like, a vehicle roadside communication device (such as VICS or FM multiplexing broadcast) for receiving traffic information and road information by a beacon receiver, and a road map database. The navigation system 34 retrieves a route to a destination and detects the road conditions on the retrieved route. The driving history recording device 35 records the road conditions of the driving route and a driving pattern of each driver. The auxiliary battery 36 supplies a power to control devices such as the controller 16.

Basic scheduling methods of the embodiment for the scheduling of storage and consumption of an energy to minimize the fuel consumption Q will now be described.

According to a first scheduling method, for example, when there is a downhill road toward the front, the energy can be collected and the battery can be charged on the downhill road. Consequently, by preliminarily driving the motor and the auxiliary equipments such as a compressor (not shown) of an air conditioner to reduce the SOC of the battery, the energy is maximally collected on the downhill road. The energy collecting ratio is therefore improved and the fuel consumption Q can be reduced by such an amount.

Figure 3A:
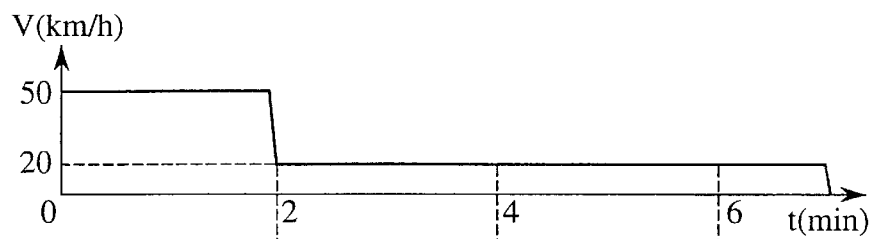
FIGS. 3A to 3D are diagrams for explaining a charging and discharging schedule according to the embodiment.
Figure 3B:
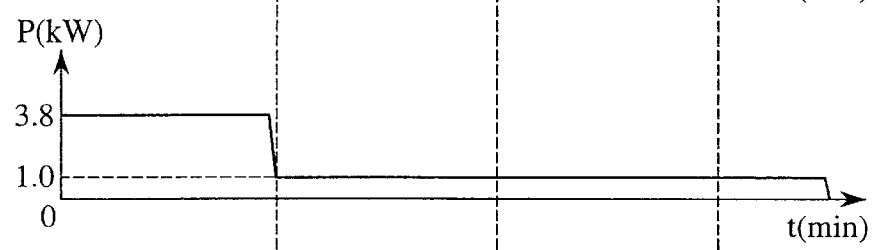
Figure 3C:
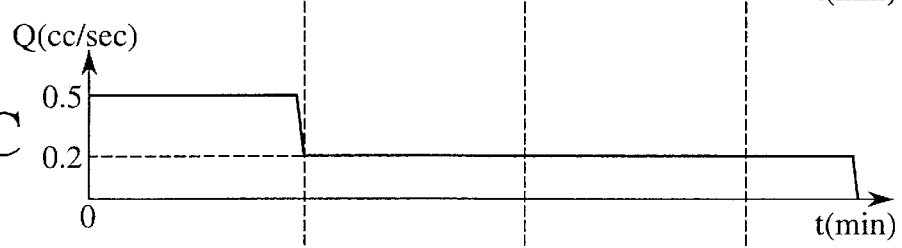
Figure 4:
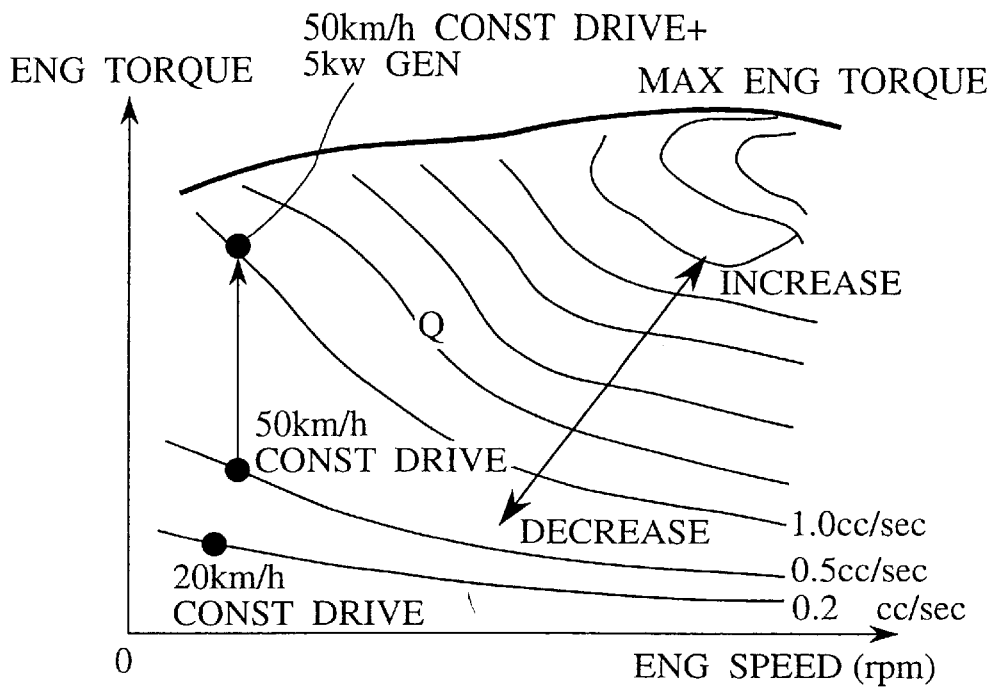
FIG. 4 shows fuel injection characteristics of the engine according to the embodiment.

According to a second scheduling method, the vehicle is driven by the motor in a section where the engine operating efficiency is low. For example, as shown in FIG. 3A, when the vehicle drives at 50 km/h (vehicle speed V) for two minutes (time t) and, after that, the vehicle drives at 20 km/h for five minutes, a power P (a positive value indicates a driving power and a negative value indicates a braking power) necessary to drive the vehicle has a pattern as shown in FIG. 3B. In the pattern, the output P is 3.8 kW for two minutes and then 1 kW for five minutes. When the vehicle is driven in the driving pattern only by the engine 2, the fuel injection quantity Q has a pattern as shown in FIG. 3C with respect to time t from the fuel injecting characteristics of the engine 2 shown in FIG. 4. The fuel consumption Q of the route can be therefore obtained as follows.

$$Q = 0.5 \text{ cc/sec} \times 2 \text{ min} \times 60 \text{ sec} + 0.2 \text{ cc/sec} \times 5 \text{ min} \times 60 \text{ sec}$$
$$= 120 \text{ cc}$$

Figure 5:
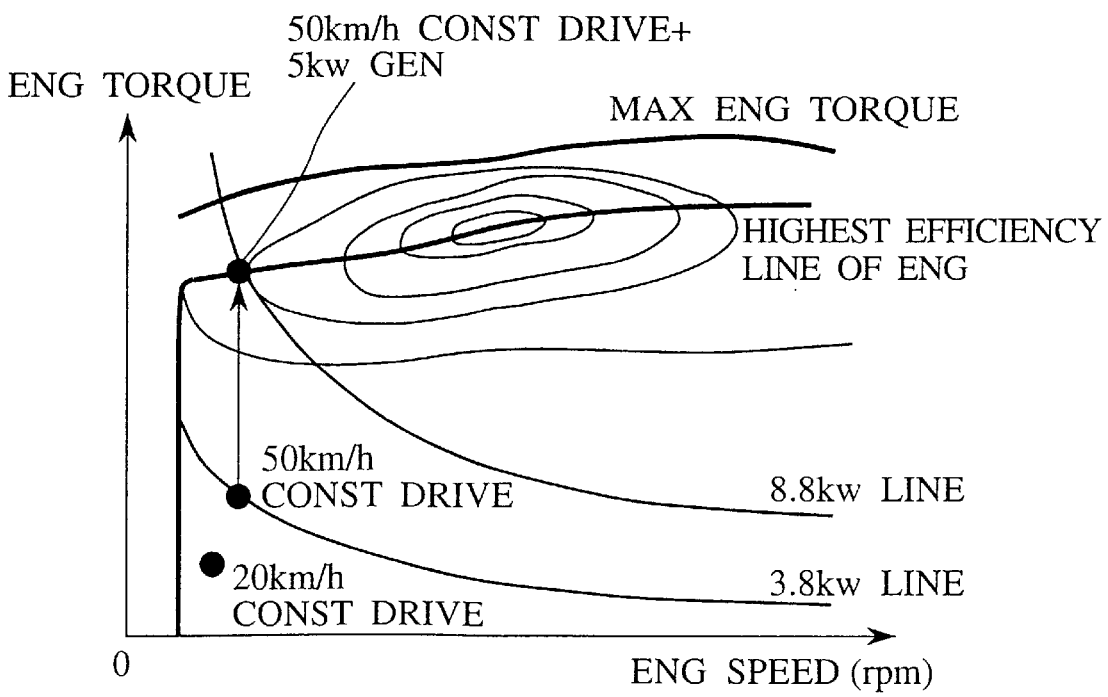
FIG. 5 shows output characteristics and efficiency characteristics of the engine according to the embodiment.

FIG. 5 shows the output torque characteristics and efficiency characteristics of the engine 2. As obviously understood from the characteristics diagram, generally, the lower the engine speed becomes, the more the efficiency deteriorates. A charging/discharging schedule is consequently made out in such a manner that the vehicle is driven by the motor 4 in a driving section of 20 km/h where the efficiency is low in the driving pattern shown in FIG. 3A and the power consumed by the motor 4 in the section is preliminarily generated in a driving section of 50 km/h by the engine 2 and stored in the main battery 15.

When the power is generated by the motor 1 while the vehicle drives at the constant speed of 50 km/h by the engine 2, as shown in FIG. 5, it is the best to increase the engine torque without changing the engine speed (rpm) and shift the operating point of the engine 2 onto the highest operative efficiency line. When the engine 2 is driven at the operating point, as shown in FIG. 5, an engine output of 8.8 kW is obtained. Even when an output 3.8 kW required for the constant drive at 50 km/h is deducted, power of 5 kW can be generated. Strictly, the quantity of power generation is reduced only by an amount of the power generating efficiency of the power generating motor 1 and the like.

The power quantity (time integral value of the required power : electric energy) in the 20 km/h driving section by the motor 4 is derived as follows.

1 kW×5 min÷60 min=1/12 kwh

Power generation time required when the electric energy of 1/12 kwh is obtained by the power of 5 kW generated in the driving section of 50 km/h by the engine 2 is as follows.

(1/12) kwh/5kw=1/60 h=1 min

That is, the power generation time is one minute. From the fuel injecting characteristics shown in FIG. 4, it is understood that the fuel injection quantity necessary at the time of power generation is 1.0 cc/sec.

Figure 3D:
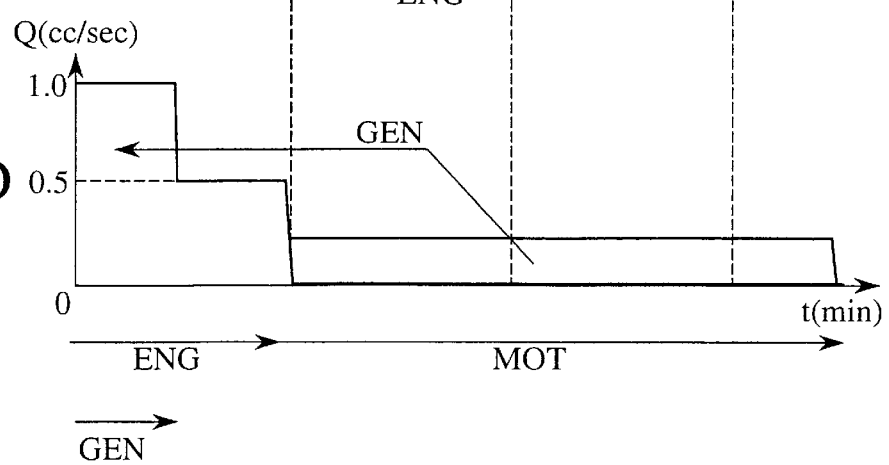

In contrast to the driving pattern shown in FIG. 3A, therefore, the fuel injection quantity pattern in the case of driving the vehicle by the motor 4 in the section of 20 km/h where the operating efficiency of the engine 2 is low is as shown in FIG. 3D. The fuel consumption quantity Q of the whole route in the fuel injection quantity pattern shown in FIG. 3D is obtained as follows.

$$Q = 1 \text{ cc/sec} \times 1 \text{ min} \times 60 \text{ sec} + 0.5 \text{ cc/sec} \times 1 \text{ min} \times 60 \text{ sec}$$
$$= 90 \text{ cc}$$

That is, the fuel consumption quantity Q is smaller than the fuel consumption quantity Q (=120 cc) in the case of driving the vehicle only by the engine 2 (FIG. 3C) by 30 cc.

As described above, on the route to the destination, the fuel consumption in the case of driving the vehicle by the motor in the section where the operating efficiency deteriorates if the vehicle is driven by the engine and generating power in another section is compared with the fuel consumption in the case of driving the vehicle by the engine. When the former is smaller than the latter, the section is selected as a section in which the vehicle is driven by the motor. That is, the vehicle is driven by the motor in the section in which the operating efficiency deteriorates when the vehicle is driven by the engine. The electric energy is generated in the section in which the operating efficiency is high even when the vehicle is driven by the engine. Consequently, the fuel consumption in the whole route can be reduced.

As obviously understood from the first and second methods of scheduling the storage and consumption of the energy described above, on the basis of the road conditions in the route to the destination and the driving history of the driver, the schedule of storing and consuming the energy, that is, the schedule of charging and discharging the battery by which the fuel consumption is minimized can be made.

Figure 6:
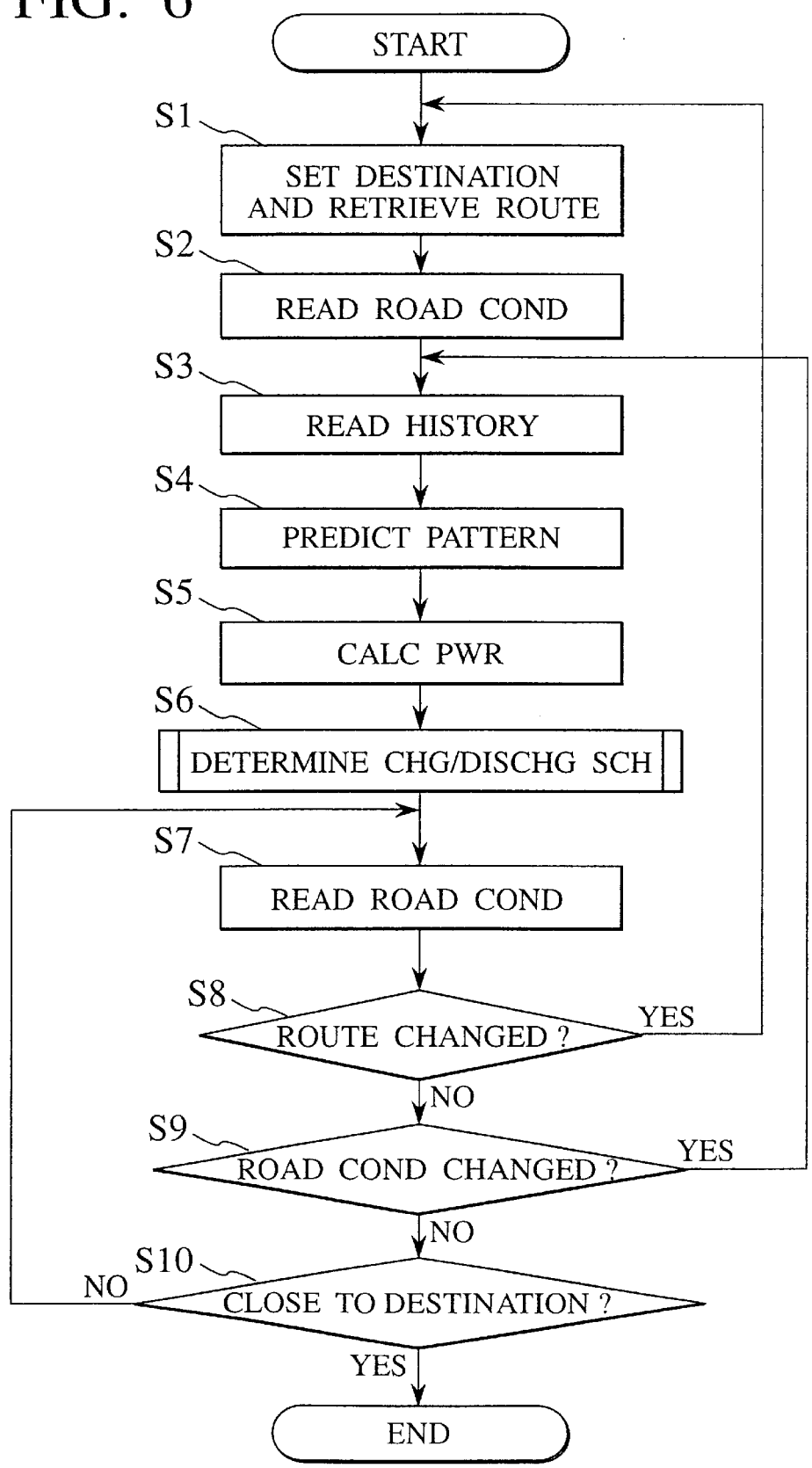
FIG. 6 is a flowchart for determining and carrying out the charging and discharging schedule according to the embodiment.

FIG. 6 is a more detailed flowchart of a program of a process of determining the charging and discharging schedule and a process of driving the vehicle 100 in accordance with the charging and discharging schedule of the embodiment. The operation of the embodiment will be described on the basis of the flowchart.

The controller 16 executes the program every predetermined time. In step S1, the destination is set by the navigation system 34 and the optimum route to the destination is retrieved by a route retrieving unit 34a of the navigation system 34. For example, a frequently used route such as a commuting road on which the vehicle repeatedly drives, drive time, and the like are recorded in the navigation system 34 in advance. When the vehicle drives at almost the same time as the recorded time on the recorded route, the destination is estimated from the recorded route. Consequently, even when the occupant does not set the destination, the destination and the route to the destination can be automatically set.

In step S2, information of the route to the destination such as the kinds of the roads, intersections, signals, and curvature and inclination of each road, traffic jam information provided by a VICS or the like, and traffic regulation information is read from a road condition sensor 34b of the navigation system 34.

Figures 7, 8:
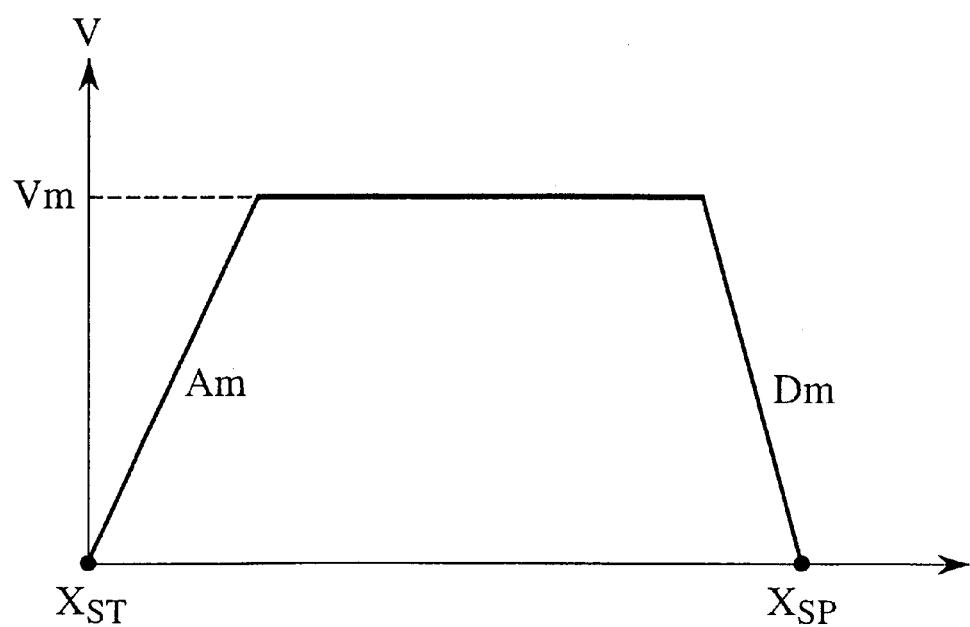
FIG. 7 shows a driving history table according to the embodiment.
FIG. 8 shows a vehicle speed pattern according to the embodiment.

In step S3, driving history is read from a driving history table 35a in the driving history recording device 35. In the driving history table 35a, as shown in FIG. 7, past average values of driving speed, acceleration upon start, deceleration upon stop, and the like are recorded in each of the kinds of roads. It is also possible to record the driving history of each driver and allow the driver to select the driving history at the start of driving. The kinds of the roads in the driving history table may be subdivided according to the width and the number of lanes of a road, installation intervals of signals, and the like. The driving history can be recorded with respect to each of frequently used roads.

In step S4, on the basis of the road conditions to the destination read in step S2 and the driving history of the occupant such as a driver read in step S3, the operating pattern on the route to the destination, that is, the driving speed pattern is estimated to predict it. First, in such estimation, the route to the destination is divided at points such as signal, intersection, tollgate curve, confluence, and point where the number of lanes is decreased, at which stop and start are predicted by a route driving unit 16a in the controller 16. By referring to the driving history table, vehicle driving velocity Vm, acceleration Am on start, and deceleration Dm on stop are read in accordance with the kind of a road every section. As shown in FIG. 8, by setting speed every section like the acceleration from the start point Xst as Am, the driving speed as Vm, and the deceleration to the stop point Xsp as Dm, a driving speed pattern is predicated and formed by a speed pattern estimating unit 16b of the controller 16. The stop at a signal and an intersection may be also estimated from the driving history. When information regarding the cycle of a signal can be obtained, the pattern can also be estimated on the basis of the information. Further, when there is no driving history, it is sufficient to set a legal speed as the driving speed and average acceleration and deceleration of a general driver as the acceleration and deceleration.

FIGS. 9A to 9E show an example of a route to a destination.

Figures 9A, 9B, 9C, 9D, 9E:
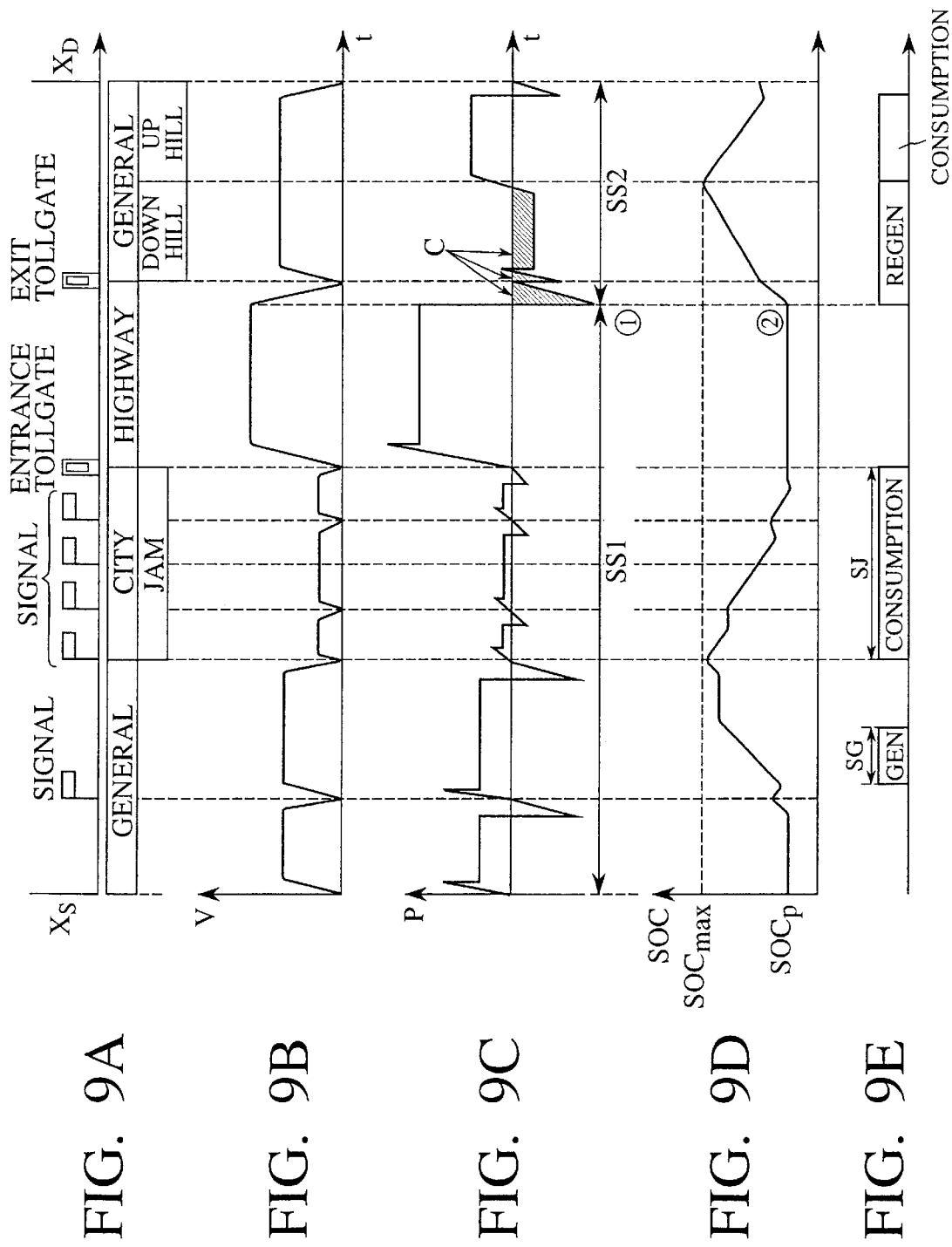
FIGS. 9A to 9E are diagrams for explaining a route to a destination according to the embodiment.

In the route, as shown in FIG. 9A, a vehicle is driven on a general road from a start point Xs, enters a city, drives on a highway and again a general road, and arrives at a destination XD. The navigation system 34 teaches that a jam occurs in the city and the general road after the highway has a downhill road and an uphill road. In the route under the road conditions, as described above, the route is divided at points where stop and start of the vehicle are predicted and a driving speed V pattern shown in FIG. 9B is predicated for each section on the basis of the road condition and the driving history data.

In step S5, an output (power) P(w) necessary for the driving is calculated by the following equation on the basis of the driving speed pattern of each section.

$$P = (\mu \cdot M \cdot g + (\rho \cdot Cd \cdot A \cdot vsp^2)/2 + M \cdot acc \cdot g + M \cdot g \cdot \sin\theta) \cdot vsp/3.6$$

where M denotes vehicle weight (kg), $\mu$ a rolling resistance coefficient, $\rho$ air density (kg/m$^3$), Cd a coefficient of air resistance, A a normal projection area (m$^2$) vsp vehicle velocity (m/sec), acc vehicle acceleration(m/sec$^2$), g gravitational acceleration (m/sec$^2$), and $\theta$ inclination (rad) of road. The first term indicates rolling resistance, the second term indicates air resistance, the third term shows acceleration resistance, and the fourth term shows inclination resistance. FIG. 9C shows the calculation result of the output P based on the road condition of FIG. 9A and the driving speed pattern of FIG. 9B. In FIG. 9C, a positive value of the output P necessary for driving the vehicle represents a driving power and a negative value shows a braking power.

Figure 10:
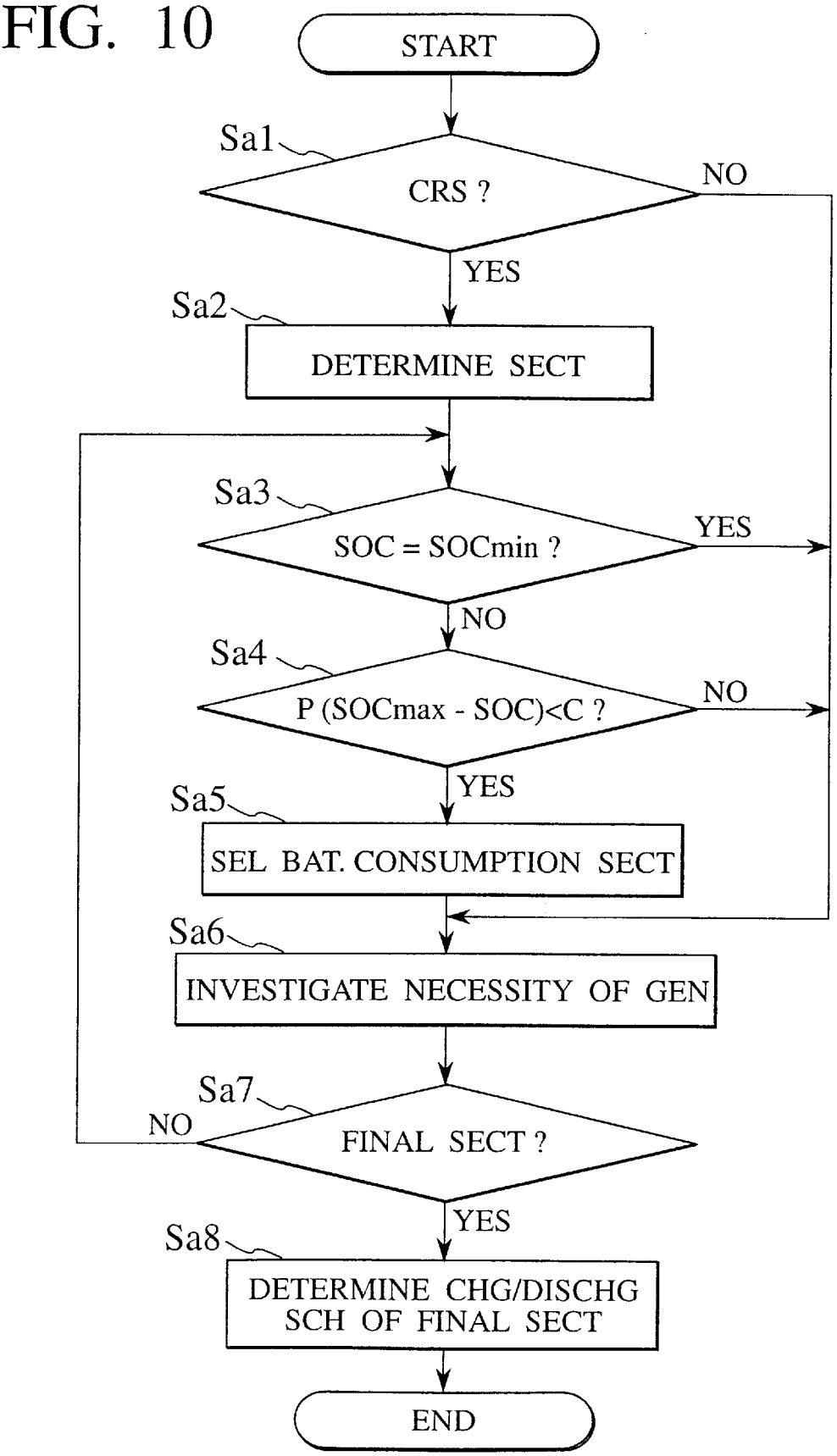
FIG. 10 shows a sub-routine of the flowchart for determining the charging and discharging schedule according to the embodiment.

In step S6, a driving schedule setting unit 16C of the controller 16 executes a subroutine shown in FIG. 10 and determines a charging/discharging schedule, that is, the operating schedule of the motor and the engine in the route to the destination.

In step Sa1 in FIG. 10, an output pattern (refer to FIG. 9C) of the route to the destination is retrieved to check whether or not there is a section in which regenerative braking is continued for predetermined time, for example, one minute or longer (hereinbelow, simply called a continuous regeneration section CRS). When there is the continuous regeneration section CRS, the program advances to step Sa2. If not, the program advances to step Sa6. In the example shown in FIG. 9C, the section from a point before the exit of the tollgate of the highway to the end of the downhill road of the general road corresponds to the continuous regeneration section CRS.

In the following step Sa2, the route to the destination is divided at the start point of the continuous regeneration section CRS into two sections. Each of the sections is set as a scheduling section. In the example shown in FIG. 9C, since the continuous regeneration section starts from the deceleration start point before the exist of the tollgate of the highway, the route is divided at the deceleration start point (point 1 in FIG. 9C) into two scheduling sections SS1 and SS2. For convenience, the section from the start point to the deceleration start point is set as the scheduling section 1 (SS1) and the section from the deceleration start point to the destination is set as the scheduling section 2 (SS2). The scheduling section SS2 includes the continuous regeneration section CRS. In the following description, the scheduling section shown in FIG. 9C will be described as an example. Obviously, the invention is not limited to the driving pattern of the route shown in FIG. 9C.

For each of the set scheduling sections SS1 and SS2, processes in steps Sa3 to Sa6 are performed. In step Sa3, whether the SOC at the start point of the scheduling section is around a preset lower limit value SOCmin or not, for example, whether the SOC is equal to SOCmin or not is determined. When the SOC of the main battery 15 at the start point of the scheduling section is around the lower limit value SOCmin, the regenerative electric energy in the scheduling section can be maximally received, so that the program advances to step Sa6. The SOC at the start point of the scheduling section is estimated and predicted on the basis of the driving shared by the engine 2 and the motor 4 in the immediately preceding scheduling section. In the example shown in FIG. 9C, the SOC at the start point of the scheduling section SS1 is the SOC at the departure position Xs. The SOC at the start point of the scheduling section SS2 including the continuous regeneration section CRS is estimated and predicted based on the driving shared by the engine 2 and the motor 4 in the immediately preceding scheduling section SS1. Whether the SOC prediction value SOCp at the start point of the scheduling section SS2 including the continuous regeneration section CRS is around the preset lower limit value SOCmin or not is determined (point 2 in FIG. 9D). When the SOC of the main battery 15 at the start point of the continuous regeneration section CRS is around the lower limit value SOCmin, the regenerative electric energy in the continuous regeneration section CRS can be maximally received, so that the program advances to step Sa6.

When the SOC prediction value SOCP at the start point of the scheduling section is not around the lower limit value SOCmin, the program advances to step Sa4. In step Sa4, a check is made to see whether the SOC exceeds a preset upper limit value SOCmax or not when the main battery 15 is charged with the regenerated electric energy in the scheduling section. That is, when an electric energy conversion value P (SOCmax−SOC) of the difference (SOCmax−SOC) between the SOC (prediction value) at the start point of the scheduling section and the upper limit value SOCmax is smaller than a regenerated electric energy C in the scheduling section, it is determined that the SOC of the main battery 15 is too large to receive the regenerated electric energy C and the program advances to step Sa5. If not, the program skips step Sa5 and advances to step Sa6.

For example, in the scheduling section SS2 including the continuous regeneration section CRS, when the electric energy conversion value P (SOCmax−SOC) of the difference (SOCmax−SOC) between the SOC (prediction value) and the upper limit value SOCmax of the main battery 15 at the start point of the section is smaller than the regenerated electric energy C of the continuous regeneration section CRS, it is determined that the SOC of the main battery 15 is too large to receive the regenerated electric energy C, so that the program advances to step Sa5. If not, the program skips step Sa5 (point 2 in FIG. 9D).

In step Sa5, according to the first method of scheduling the storage and consumption of the energy, the main battery 15 is consumed to reduce the SOC in the scheduling section just before the continuous regeneration section CRS so that the main battery 15 can maximally receive the regenerated electric energy C in the continuous regeneration section CRS. Specifically, in the schedule section SS1 just before the continuous regeneration section CRS, the driving section by the motor 4 (including an assisting driving section of the engine 2 by the motor 4) is selected. In the motor driving section, the power is supplied from the main battery 15 to the motor 4 and is consumed. In the example shown in FIGS. 9C and 9D, the main battery 15 is consumed to reduce the SOC in the scheduling section SS1 just before the continuous regeneration section CRS so that the main battery 15 can maximally receive the regenerated electric energy C in the continuous regenerative section CRS. Specifically, in the schedule section SS1 just before the continuous regeneration section CRS, the driving section by the motor 4 (including the assisting driving section of the engine 2 by the motor 4) is selected. In the motor driving section, the power is supplied from the main battery 15 to the motor 4 and consumed.

The method of selecting the driving section by the motor 4 to reduce the SOC of the main battery 15 will now be described.

Basically, the section in which the engine 2 is operated at the lowest efficiency operating point within the scheduling section just before the continuous regeneration section is selected as the driving section by the motor 4. In the example shown in FIG. 9E, a jam section SJ in the city in the scheduling section SS1 corresponds to the driving section. When the SOC of the main battery 15 cannot be sufficiently reduced only in a single section, a plurality of sections may be selected as a motor driving section. When there is no driving section in which the efficiency of the engine 2 is low, the assisting driving section of the engine 2 by the motor 4 in which the engine efficiency can be increased even a little may be selected or the vehicle may be driven by the motor 4 at the time of acceleration of the vehicle at which the operating efficiency of the engine 2 is low.

When the operating efficiency by the engine 2 is low and the section in which driving or assisting driving performed by the motor 4 is determined is long, there is a case such that the SOC of the main battery 15 is reduced more than necessary and becomes equal to or lower than the lower limit value SOCmin. In such a case, the necessity of generation of power in advance to prepare for the battery consumption in the motor driving section is investigated in step Sa6.

Although the generation of power in advance so as to prepare for the motor driving is basically carried out in accordance with the second method of scheduling the storage and consumption of the energy, the SOC of the main battery 15 at the start point of the continuous regeneration section CRS should not exceed the value at which the regenerated electric energy C in the continuous regeneration section CRS can be completely collected.

In the example shown in FIG. 9E, in a section SG of the general road just before a section ST in which the driving by the motor 4 is determined in the scheduling section SS1, power is generated by the motor 1. At this time, on the basis of the SOC of the main battery 15 at the start point (departing position) in the scheduling section SS1 and the consumption of the main battery 15 in the driving section by the motor 4, the power generation amount is adjusted so that the SOC at the start point of the continuous regeneration section CRS (start point in the schedule section SS2) does not become equal to or larger that a value at which the regenerated electric energy C of the continuous regeneration section CRS can be completely received. Specifically, the battery SOC at the start point of the continuous regeneration section CRS has to be set to SOC4 or lower. When the battery SOC at the start point (departure position) of the scheduling section SS1 is SOC1, the SOC conversion value of the power generation amount is SOC2, and the SOC conversion value of the battery consumption in the motor driving section SJ is SOC3, the power generation amount is adjusted so as to satisfy the following equation.

$$(SOC1 + SOC2 - SOC3) \leq SOC4$$

In step Sa7, whether the scheduling section to be processed next is the final section or not is checked. When it is the final scheduling section, the program advances to step Sa8. If not, the program returns to step Sa3 and the above-described processes are repeated. In step Sa8, the charging and discharging schedule in the final scheduling section is examined and determined. In the example shown in FIG. 9E, in the final scheduling section SS2, the regenerated electric energy C is completely collected and the main battery 15 is charged with the regenerated electric energy C in the continuous regeneration section CRS. After that, the motor 4 is driven on the uphill road to assist the engine 2, thereby consuming the main battery 15.

When the charging and discharging schedule is determined as described above, the program returns to step S7 in FIG. 6 where the position of the vehicle and the road condition on the route to the destination are read from the navigation system 34. At this time, when the distance between the vehicles detected by the distance sensor 29 is short and the driving speed is low, it may be determined that the road is jammed. In the following step S8, whether the vehicle is off the route set in step S1 or not is determined. When the route has been changed, the program returns to step S1. If not, the program advances to step S9. In step S9, whether the road condition has changed or not such as a case where a jam newly occurs on the route to the destination is checked from the collected road condition. When the road condition has changed, the program returns to step S3. When the road condition has not changed, the program advances to step S10. In step S10, whether the vehicle has arrived at the destination or not is checked. If yes, the process is finished. If not, the program returns to step S7 and the processes are repeated.

According to the foregoing embodiment, the route is divided into a plurality of sections on the basis of points at which start and stop of the vehicle are predicted. On the basis of the road condition and the driving history, the vehicle speed pattern is estimated for each of the plurality of sections. On the basis of the vehicle speed pattern and the fuel consumption characteristics of the engine, the engine and motor operating schedule is set so as to minimize the fuel consumption of the engine to the destination.

Consequently, by considering not only the fuel consumption at the time of constant driving but also the decrease in fuel consumption by the energy collection at the time of speed reduction and braking of the vehicle and the increase in fuel consumption at the time of acceleration of the vehicle, the accurate fuel consumption according to the road condition of the route to the destination and the driving history of the driver can be obtained and the fuel consumption of the engine to the destination can be effectively minimized.

By setting the section in which the engine operating efficiency is low as the section in which the hybrid vehicle is driven by the motor, the fuel consumption of the engine to the destination can be more effectively minimized.

The route is divided into a plurality of sections by using the start point of the regeneration section in which the motor continuously performs the regenerating operation for predetermined time or longer as a boundary. On the basis of the road condition and the driving history, the vehicle speed pattern is estimated for each of the plurality of sections. On the basis of the vehicle speed pattern and the fuel consumption characteristics of the engine, the engine and motor operating schedule is set so as to minimize the fuel consumption of the engine to the destination.

Consequently, by considering not only the fuel consumption at the time of constant driving but also the decrease in fuel consumption by the energy collection at the time of deceleration and braking of the vehicle and the increase in fuel consumption at the time of acceleration of the vehicle, the accurate fuel consumption according to the road condition of the route to the destination and the driving history of the driver can be obtained and the fuel consumption of the engine to the destination can be effectively minimized.

Since the engine and motor operating schedule is set on the basis of the charging state of the battery at the start point of the regeneration section so that the power regenerated in the regeneration section can be collected by the battery, the braking energy of the vehicle can be certainly collected and the fuel consumption of the engine to the destination can be more effectively minimized.

The section before the start point of the regeneration section, in which the engine operating efficiency is lowered when the hybrid vehicle is driven by the engine is set as a driving section in which the hybrid vehicle is driven by the motor or by the motor and engine. The battery is consumed in the driving section so that the power regenerated in the regeneration section can be collected by the battery on the basis of the charging state of the battery at the start point of the regeneration section. Consequently, the braking energy of the vehicle can be more certainly collected and the fuel consumption of the engine to the destination can be more effectively minimized.

The entire contents of a Patent Application No. TOKUGANHEI 11-140154 with a filing date of May 20, 1999 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A driving control apparatus of a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising:

a route retrieving unit retrieving a route to a destination;

a road condition detecting unit detecting a road condition of the route;

a route dividing unit dividing the route into a plurality of sections on the basis of a point at which start of the hybrid vehicle is predicted and a point at which stop of the hybrid vehicle is predicted on the basis of the road condition;

a driving history recording unit recording driving history;

a vehicle speed pattern estimating unit estimating a vehicle speed pattern for each of the plurality of sections on the basis of the road condition and the driving history; and a schedule setting unit setting an operating schedule of the engine and the motor so as to minimize the fuel consumption of the engine to the destination on the basis of the vehicle speed pattern and fuel consumption characteristics of the engine, wherein among the plurality of sections, the schedule setting unit sets a section, in which operating efficiency of the engine is low, as a driving section in which the hybrid vehicle is driven by the motor, when the fuel consumption of the engine in the case that the hybrid vehicle is driven by the motor in the section in which the operating efficiency of the engine is low and the engine drives the motor to generate the power in another section is smaller than the fuel consumption of the engine in the case that the hybrid vehicle is driven by the engine in the section in which the operating efficiency of the engine is low.

2. A driving control apparatus of a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising:

a route retrieving unit retrieving a route to a destination;

a road condition detecting unit detecting a road condition of the route;

a route dividing unit dividing the route into a plurality of sections by using a start point of a regeneration section, in which the motor continuously performs a regenerating operation for a predetermined time or longer, as a border on the basis of the road conditions;

a vehicle speed pattern estimating unit estimating a vehicle speed pattern for each of the plurality of sections on the basis of the road condition; and a schedule setting unit setting an operating schedule of the engine and the motor so as to minimize the fuel consumption of the engine to the destination on the basis of the vehicle speed pattern and fuel consumption characteristics of the engine, wherein the schedule setting unit sets the operating schedule of the engine and the motor such that the battery has a state of charge thereof at the start point of the regeneration section to store the power regenerated in the regeneration section.

3. A driving control apparatus of a hybrid vehicle according to claim 2, wherein among the plurality of sections, the schedule setting unit sets a section before the start point of the regeneration section, in which the operating efficiency of the engine is low when the hybrid vehicle is driven by the engine, as a driving section in which the hybrid vehicle is driven by the motor or by the motor and the engine, thereby consuming the battery in the driving section and setting the state of the charge of the battery at the start point of the regeneration section so that the power regenerated in the regeneration section can be collected by the battery.

4. A driving control apparatus of a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising:

route dividing means for dividing a route to a destination into a plurality of sections on the basis of a point at which start of the vehicle is predicted and a point at which stop of the vehicle is predicted on the basis of a road condition of the route;

vehicle speed pattern estimating means for estimating a vehicle speed pattern for each of the plurality of sections on the basis of the road condition and a driving history; and schedule setting means for setting an operating schedule of the engine and the motor so as to minimize the fuel consumption of the engine to the destination on the basis of the vehicle speed pattern and fuel consumption characteristics of the engine, wherein among the plurality of sections, the schedule setting means sets a section, in which operating efficiency of the engine is low, as a driving section in which the hybrid vehicle is driven by the motor, when the fulel consumption of the engine in the case that the hybrid vehicle is driven by the motor in the section in which the operating efficiency of the engine is low and the engine drives the motor to generate the power in another section is smaller than the fuel consumption of the engine in the case that the hybrid vehicle is driven by the engine in the section in which the operating efficiency of the engine is low.

5. A driving control apparatus of a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising:

route dividing means for dividing a route to a destination into a plurality of sections by using a start point of a regeneration section in which the motor continuously performs a regenerating operation for a predetermined time or longer as a border on the basis of a road condition of the route;

vehicle speed pattern estimating means for estimating a vehicle speed pattern for each of the plurality of sections on the basis of the road condition and a driving history; and schedule setting means for setting an operating schedule of the engine and the motor so as to minimize the fuel consumption of the engine to the destination on the basis of the vehicle speed pattern and fuel consumption characteristics of the engine, wherein among the plurality of sections, the schedule setting means sets a section, in which operating efficiency of the engine is low, as a driving section in which the hybrid vehicle is driven by the motor, when the fuel consumption of the engine in the case that the hybrid vehicle is driven by the motor in the section in which the operating efficiency of the engine is low and the engine drives the motor to generate the power in another section is smaller than the fuel consumption of the engine in the case that the hybrid vehicle is driven by the engine in the section in which the operating efficiency of the engine is low.

6. A method of driving a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising:

dividing a route to a destination into a plurality of sections on the basis of a point at which start of the vehicle is predicted and a point at which stop of the vehicle is predicted on the basis of a road condition of the route;

estimating a vehicle speed pattern for each of the plurality of sections on the basis of the road condition and a driving history; and setting an operating schedule of the engine and the motor so as to minimize the fuel consumption of the engine to the destination on the basis of the vehicle speed pattern and fuel consumption characteristics of the engine, wherein among the plurality of sections, a section, in which operating efficiency of the engine is low, is set as a driving section in which the hybrid vehicle is driven by the motor, when the fuel consumption of the engine in the case that the hybrid vehicle is driven by the motor in the section in which the operating efficiency of the engine is low and the engine drives the motor to generate the power in another section is smaller than the fuel consumption of the engine in the case that the hybrid vehicle is driven by the engine in the section in which the operating efficiency of the engine is low.

7. A method of driving a hybrid vehicle having a battery, a motor, and an engine, in which power is supplied from the battery to the motor, power generated by driving the motor by the engine and regenerated power of the motor are supplied to the battery, and the hybrid vehicle is driven by at least one of the motor and the engine, comprising:

dividing a route to a destination into a plurality of sections by using a start point of a regeneration section in which the motor continuously performs a regenerating operation for a predetermined time or longer as a border on the basis of a road condition of the route;

estimating a vehicle speed pattern for each of the plurality of sections on the basis of the road condition and a driving history; and setting an operating schedule of the engine and the motor so as to minimize the fuel consumption of the engine to the destination on the basis of the vehicle speed pattern and fuel consumption characteristics of the engine, wherein among the plurality of sections, a section, in which operating efficiency of the engine is low, is set as a driving section in which the hybrid vehicle is driven by the motor, when the fuel consumption of the engine in the case that the hybrid vehicle is driven by the motor in the section in which the operating efficiency of the engine is low and the engine drives the motor to generate the power in another section is smaller than the fuel consumption of the engine in the case that the hybrid vehicle is driven by the engine in the section in which the operating efficiency of the engine is low.

* * * * *